United States Patent
Kim et al.

(10) Patent No.: US 8,823,891 B2
(45) Date of Patent: Sep. 2, 2014

(54) BI-STABLE CHIRAL SPLAY NEMATIC MODE LIQUID CRYSTAL DISPLAY DEVICE AND METHOD OF DRIVING THE SAME

(75) Inventors: Dong-Guk Kim, Goyang-si (KR); Wook-Sung Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 268 days.

(21) Appl. No.: 13/099,895

(22) Filed: May 3, 2011

(65) Prior Publication Data
US 2011/0267553 A1    Nov. 3, 2011

(30) Foreign Application Priority Data
May 3, 2010    (KR) .................. 10-2010-0041327

(51) Int. Cl.
*G02F 1/133*    (2006.01)

(52) U.S. Cl.
USPC ............. 349/33; 349/84; 349/191; 349/139; 349/140; 349/141

(58) Field of Classification Search
CPC ............................... G02F 1/1333; G02F 1/133
USPC ............. 349/33, 84, 191, 139–141, 41, 37; 345/214, 208, 94, 107, 87, 212, 88, 90, 345/205, 690
See application file for complete search history.

(56) References Cited

U.S. PATENT DOCUMENTS 5,796,447 A * 8/1998 Okumura et al. ............ 349/33
7,859,527 B2 * 12/2010 Hirota et al. ................ 345/208
(Continued)

FOREIGN PATENT DOCUMENTS

| | | | | |
|---|---|---|---|---|
| JP | 2005-070729 | * | 3/2005 | ............ G02F 1/139 |
| KR | 10-0554405 | | 2/2006 | |
| KR | 100824060 B1 | | 4/2008 | |
| KR | 1020080053597 A | | 6/2008 | |

OTHER PUBLICATIONS

Office Action issued in corresponding Korean Patent Application No. 10-2010-0041327, mailed May 30, 2013, 4 pages.

*Primary Examiner* — Edward Glick
*Assistant Examiner* — Sang V Nguyen
(74) *Attorney, Agent, or Firm* — Brinks Gilson & Lione

(57) ABSTRACT

A liquid crystal display device includes: first and second substrates facing and spaced apart from each other; a gate line and a data line on the first substrate, the gate line and the data line crossing each other to define a pixel region; a thin film transistor and a pixel electrode in the pixel region on the first substrate, the thin film transistor connected to the gate line and the data line, the pixel electrode connected to the thin film transistor; a common electrode on the second substrate, the common electrode facing the pixel electrode; at least one first reset electrode and at least one second reset electrode on one of the first and second substrates, the at least one first reset electrode and the at least one second reset electrode spaced apart from each other; and a bi-stable chiral splay nematic liquid crystal layer between the first and second substrates, the bi-stable chiral splay nematic liquid crystal layer having bi-stable states of a splay state as an initial state and a π-twist state, wherein first and second reset voltages are applied to the at least one first reset electrode and the at least one second reset electrode, respectively, and wherein the bi-stable chiral splay nematic liquid crystal layer transitions from the π-twist state to the splay state by applying the first and second reset voltages.

6 Claims, 3 Drawing Sheets

(56) References Cited

U.S. PATENT DOCUMENTS

| | | | |
|---|---|---|---|
| 2006/0125715 A1* | 6/2006 | Choi | 345/14 |
| 2006/0164370 A1* | 7/2006 | Park et al. | 345/98 |
| 2006/0181492 A1* | 8/2006 | Gates et al. | 345/84 |
| 2006/0274011 A1* | 12/2006 | Igarashi et al. | 345/94 |
| 2008/0170166 A1* | 7/2008 | Do et al. | 349/33 |
| 2008/0211760 A1* | 9/2008 | Baek et al. | 345/98 |
| 2009/0219238 A1* | 9/2009 | Furuya et al. | 345/87 |
| 2010/0110053 A1* | 5/2010 | Katoh et al. | 345/207 |
| 2010/0128025 A1* | 5/2010 | Yen et al. | 345/214 |
| 2010/0195008 A1* | 8/2010 | Hegmann et al. | 349/33 |

* cited by examiner

BI-STABLE CHIRAL SPLAY NEMATIC MODE LIQUID CRYSTAL DISPLAY DEVICE AND METHOD OF DRIVING THE SAME

This application claims the benefit of Korea Patent Application No. 10-2010-0041327, filed on May 3, 2010, the entire contents of which is incorporated herein by reference for all purposes as if fully set forth herein.

BACKGROUND

1. Field of the Invention

The present disclosure relates to a liquid crystal display device, and more particularly, to a bi-stable chiral splay nematic mode liquid crystal display device and a method of driving the bi-stable chiral splay nematic mode liquid crystal display device.

2. Discussion of the Related Art

As the information age progresses, display devices processing and displaying a large amount of information have been rapidly developed. Recently, flat panel display (FPD) devices such as a liquid crystal display (LCD) device, a plasma display panel (PDP) device and an organic light emitting diode (OLED) device have been suggested. Among the various FPD devices, the LCD device has been widely used for its superiorities of small size, light-weight, thin profile and low power consumption.

In general, a twisted nematic (TN) mode LCD device using a nematic liquid crystal is widely used. In the TN mode LCD device, a pixel electrode is formed in each pixel region on an array substrate as a lower substrate and a common electrode is formed on a color filter substrate as an upper substrate. A data voltage and a common voltage are applied to the pixel electrode and the common electrode, respectively, to generate a vertical electric field between the pixel electrode and the common electrode and liquid crystal molecules in a liquid crystal layer between the pixel electrode and the common electrode are re-aligned according to the vertical electric field. As a result, a transmittance of the liquid crystal layer is changed and images are displayed.

The TN mode LCD device displays images by re-aligning the liquid crystal molecules according to the electric field generated by a voltage difference between the pixel electrode and the common electrode. When the vertical electric field is not generated, the TN mode liquid crystal molecules return to an initial orientation state. Accordingly, the voltages are kept to be applied to the pixel electrode and the common electrode for the TN mode LCD device to display images.

Recently, an E-book or an E-paper, where a fixed image such as a text is displayed for a relatively long time period without changes, has been the subject of research and development. When the TN mode LCD device is applied to the E-book or the E-paper, a relatively high power is unnecessarily consumed for displaying a fixed image for a relatively long time period as for displaying a moving image. As a result, an LCD device applicable to an E-book or an E-paper with lower power consumption has been required.

BRIEF SUMMARY

A liquid crystal display device includes: first and second substrates facing and spaced apart from each other; a gate line and a data line on the first substrate, the gate line and the data line crossing each other to define a pixel region; a thin film transistor and a pixel electrode in the pixel region on the first substrate, the thin film transistor connected to the gate line and the data line, the pixel electrode connected to the thin film transistor; a common electrode on the second substrate, the common electrode facing the pixel electrode; at least one first reset electrode and at least one second reset electrode on one of the first and second substrates, the at least one first reset electrode and the at least one second reset electrode spaced apart from each other; and a bi-stable chiral splay nematic liquid crystal layer between the first and second substrates, the bi-stable chiral splay nematic liquid crystal layer having bi-stable states of a splay state as an initial state and a π-twist state, wherein first and second reset voltages are applied to the at least one first reset electrode and the at least one second reset electrode, respectively, and wherein the bi-stable chiral splay nematic liquid crystal layer transitions from the π-twist state to the splay state by applying the first and second reset voltages.

In another aspect, a method of driving a liquid crystal display device including a bi-stable chiral splay nematic liquid crystal layer having bi-stable states of a splay state as an initial state and a π-twist state includes: applying a data voltage and a common voltage to a pixel electrode in a pixel region and a common electrode facing the pixel electrode, respectively during a writing period; floating the pixel electrode and the common electrode such that the bi-stable chiral splay nematic liquid crystal layer has the bi-stable states corresponding to the data voltage during a memory period; and applying first and second reset voltages to at least one first reset electrode and at least one second reset electrode, respectively, during a reset period, wherein the bi-stable chiral splay nematic liquid crystal layer transitions from the π-twist state to the splay state during the reset period.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to embodiments of the present invention, examples of which are illustrated in the accompanying drawings. Wherever possible, similar reference numbers will be used to refer to the same or similar parts.

Figure 1:
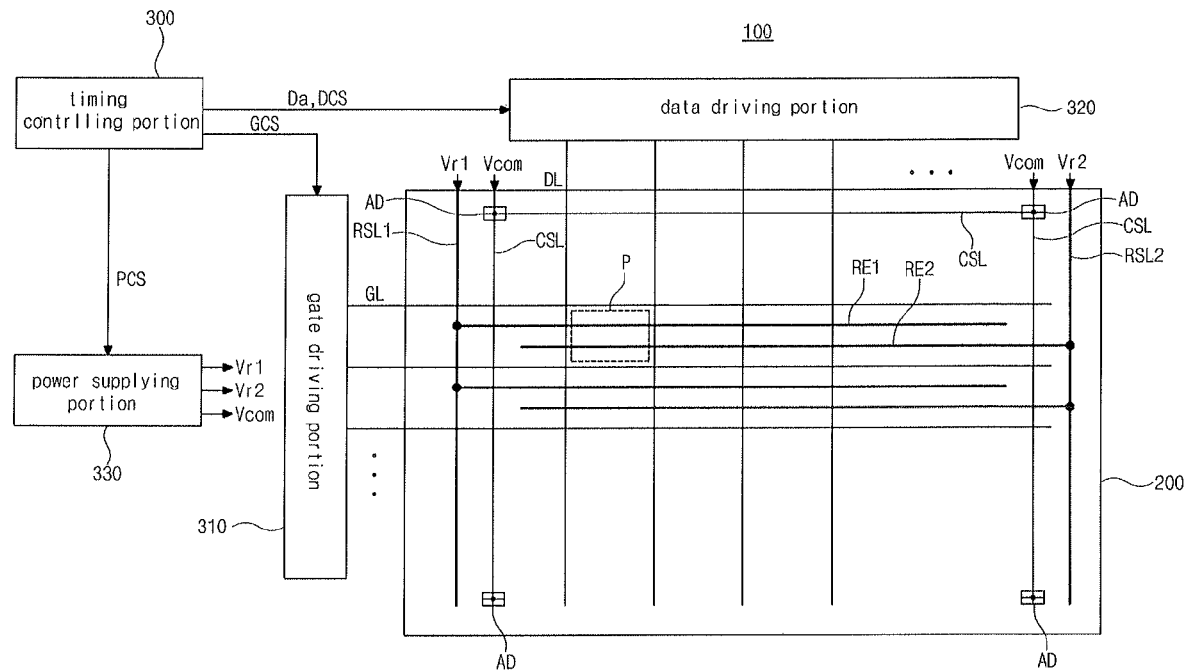
FIG. 1 is a view showing a bi-stable chiral splay nematic mode liquid crystal display device according to an embodiment of the present invention.
Figure 2:
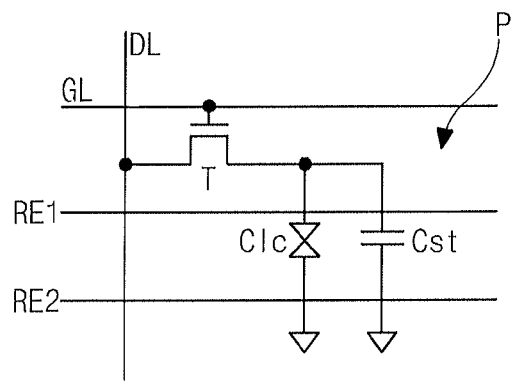
FIG. 2 is a view showing an equivalent circuit to a single pixel region of a bi-stable chiral splay nematic mode liquid crystal display device according to an embodiment of the present invention.

FIG. 1 is a view showing a bi-stable chiral splay nematic mode liquid crystal display device according to an embodiment of the present invention, and FIG. 2 is a view showing an equivalent circuit to a single pixel region of a bi-stable chiral splay nematic mode liquid crystal display device according to an embodiment of the present invention.

In FIG. 1, a bi-stable chiral splay nematic (BCSN) mode liquid crystal display (LCD) device 100 includes a liquid crystal panel 200 and a driving circuit unit including a timing controlling portion 300, a gate driving portion 310, a data driving portion 320 and a power supplying portion 330. The driving circuit unit generates various signals and supplies the various signals to the liquid crystal panel 200.

Although not shown in FIG. 1, when the BCSN mode LCD device 100 has a transmissive type or a transflective type, the BCSN mode LCD device 100 may further include a backlight unit. In addition, when the BCSN mode LCD device 100 has a reflective type, a backlight unit is not required for the BCSN mode LCD device 100.

The liquid crystal panel 200 displaying images includes a plurality of pixel regions P in matrix along horizontal and vertical directions. In the liquid crystal panel 200, a plurality of gate lines GL are formed along the horizontal direction and a plurality of data lines DL are formed along the vertical direction. In addition, a plurality of first reset electrodes RE1 and a plurality of second reset electrodes RE2 are formed along the horizontal direction. The plurality of first reset electrodes RE1 and the plurality of second reset electrodes RE2 are spaced apart from the plurality of gate lines GL and each of the plurality of first reset electrodes RE1 and the plurality of second reset electrodes RE2 may be disposed between adjacent two gate lines GL.

In FIG. 2, a thin film transistor (TFT) T connected to the corresponding gate line GL and the corresponding data line DL and a liquid crystal capacitor Clc connected to the TFT T are formed in each pixel region P. The liquid crystal capacitor Clc includes a pixel electrode PE connected to the TFT T, a common electrode CE facing and spaced apart from the pixel electrode PE and a liquid crystal layer 250 (of FIG. 3) between the pixel electrode PE and the common electrode CE. The liquid crystal layer 250 has a bi-stable property such that two stable states exist. For example, the liquid crystal layer 250 may include bi-stable chiral splay nematic (BCSN) liquid crystal molecules formed by adding chiral dopants to nematic liquid crystal molecules.

A data voltage corresponding to an image is applied to the pixel electrode PE and a common voltage Vcom (of FIG. 1) is applied to the common electrode CE. A vertical electric field is generated between the pixel electrode PE and the common electrode CE according to a difference of the data voltage and the common voltage Vcom and the liquid crystal layer 250 is driven by the vertical electric field, thereby the image displayed.

First and second reset voltages Vr1 and Vr2 (of FIG. 1) are applied to the first and second reset electrodes RE1 and RE2, respectively. A horizontal electric field is generated between the first and second reset electrodes RE1 and RE2 according to a difference of the first and second reset voltages Vr1 and Vr2 and the liquid crystal layer 250 is reset by the horizontal electric field.

Further, a storage capacitor Cst may be formed in each pixel region P. The storage capacitor Cst keeps the data voltage applied to the pixel electrode PE during a frame. One electrode of the storage capacitor Cst may be connected to the pixel electrode PE and the other electrode of the storage capacitor Cst may be connected to a common line (not shown). The common line may be formed to be parallel to the gate line GL and the first and second reset electrodes RE1 and RE2.

A change in states of the liquid crystal layer of the BCSN mode LCD device due to the vertical electric field and the horizontal electric field will be illustrated hereinafter.

Figure 3:
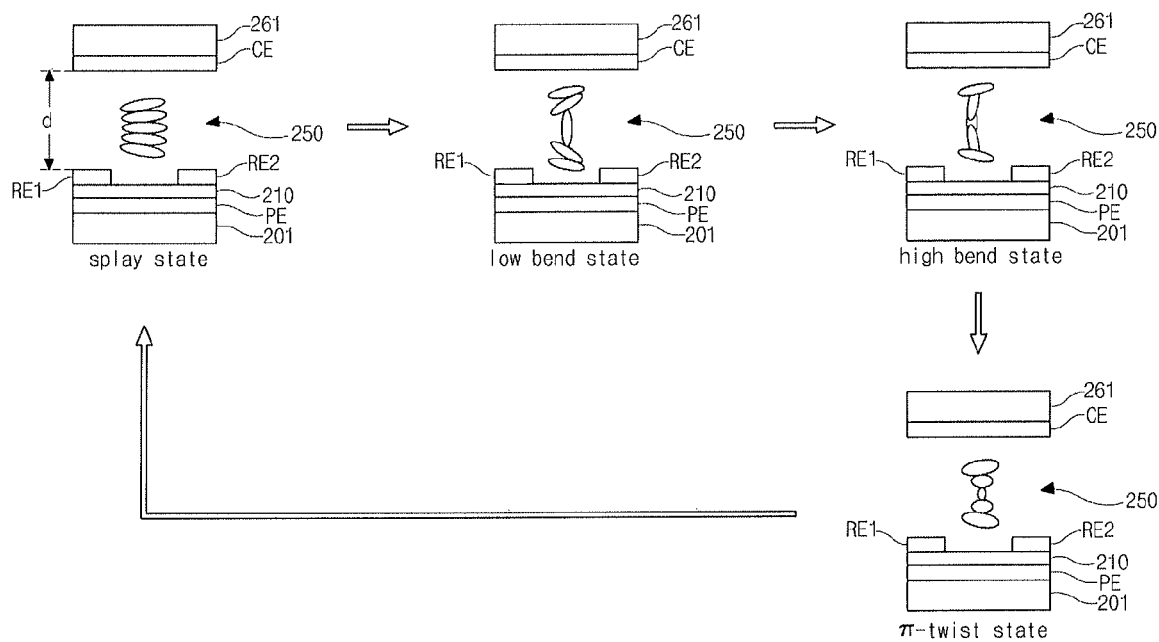
FIG. 3 is a view showing states of a liquid crystal layer of a bi-stable chiral splay nematic mode liquid crystal display device according to an embodiment of the present invention.

FIG. 3 is a view showing states of a liquid crystal layer of a bi-stable chiral splay nematic mode liquid crystal display device according to an embodiment of the present invention.

In FIG. 3, a liquid crystal layer 250 of a bi-stable chiral splay nematic (BCSN) mode liquid crystal display device includes BCSN liquid crystal molecules having a bi-stable property. For example, the BCSN liquid crystal molecules may be formed by adding chiral dopants to nematic liquid crystal molecules.

The BCSN liquid crystal molecules have two stable states, i.e., bi-stable states. For example, the BCSN liquid crystal molecules are stabilized in both a splay state and a π-twist state. Accordingly, when the BCSN liquid crystal molecules have one of the splay state and the π-twist state, the BCSN liquid crystal molecules keep the alignment without an additional applied voltage. The bi-stable states may be obtained by applying a vertical electric field or a horizontal electric field to the BCSN liquid crystal molecules.

A liquid crystal panel 200 (of FIG. 1) includes first and second substrates 201 and 261 facing and spaced apart from each other and a liquid crystal layer 250 between the first and second substrates 201 and 261. The liquid crystal layer 250 includes BCSN liquid crystal molecules.

A pixel electrode PE is formed on an inner surface of the first substrate 201 and a common electrode CE is formed on an inner surface of the second substrate 261. In addition, first and second reset electrodes RE1 and RE2 are formed on one of the inner surfaces of the first and second substrates 201 and 261. When the first and second reset electrodes RE1 and RE2 are formed on the inner surface of the first substrate 201, an insulating layer 210 may be formed between the first and second reset electrodes RE1 and RE2 and the pixel electrode PE. For example, the first and second reset electrodes RE1 and RE2 may be formed on the pixel electrode PE or may be formed under the pixel electrode PE. Further, a plurality of first reset electrodes RE1 and a plurality of second reset electrodes RE2 may be disposed in the pixel region P such that the plurality of first reset electrodes RE1 alternate with and are parallel to the plurality of second reset electrodes RE2. The first reset electrode RE1 and the second reset electrode RE2 may be spaced apart from each other by a spacing distance. For example, the spacing distance may be within a range of about 3 μm to about 100 μm.

The pixel electrode PE may be formed in the substantially whole pixel region P. The pixel electrode PE may include a transparent conductive material such as indium-tin-oxide (ITO), indium-zinc-oxide (IZO) and indium-tin-zinc-oxide (ITZO). In addition, the first and second reset electrodes RE1 and RE2 may include a transparent conductive material as mentioned above or an opaque conductive material.

The common electrode CE may be formed on the substantially whole inner surface of the second substrate 261. As a result, an equal common voltage may be applied to all the pixel regions P. In addition, the common electrode may include a transparent conductive material as mentioned above.

A gate line GL (of FIG. 2), a data line DL (of FIG. 2) and a thin film transistor (TFT) T (of FIG. 2) may be formed on the inner surface of the first substrate 201. Although not shown in FIG. 3, first and second orientation layers may be formed on the inner surfaces of the first and second substrates 201 and 206, respectively, for an initial orientation of the BCSN liquid crystal molecules. The BCSN liquid crystal molecules may have an initial orientation of a splay state. Further, first and second polarizing plates may be formed on outer surfaces of the first and second substrates 201 and 206, respectively.

When no voltage is applied to the pixel electrode PE, the common electrode CE and first and second reset electrodes RE1 and RE2, the BCSN liquid crystal molecules of the liquid crystal layer 250 have a splay state which is one of the bi-stable states. In the splay state, the BCSN liquid crystal molecules have a twist angle of about 0° and a predetermined tilt angle.

When a data voltage is applied to the pixel electrode PE and a common voltage Vcom (of FIG. 1) is applied to the common electrode CE, a vertical electric field is generated between the pixel electrode PE and the common electrode CE due to a difference of the data voltage and the common voltage Vcom. The vertical electric field is applied to the BCSN liquid crystal molecules so that the BCSN liquid crystal molecules can transition from the splay state to a bend state. In detail, the BCSN liquid crystal molecules may transition from the splay state to a high bend state through a low bend state according to the difference of the data voltage and the common voltage Vcom. As the BCSN liquid crystal molecules transition to the high bend state, most of the BCSN liquid crystal molecules rise along the vertical electric field such that directors of the BCSN liquid crystal molecules are re-aligned along the direction of the vertical electric field. Here, the liquid crystal layer 250 including the BCSN liquid crystal molecules may partially transition to the high bend state according to a magnitude of the difference of the data voltage and the common voltage Vcom and an applied time of the data voltage and the common voltage Vcom. For example, an area of a portion of the liquid crystal layer 250 having the high bend state may be proportional to the magnitude and the applied time of the data voltage.

Next, when the data voltage and the common voltage applied to the pixel electrode PE and the common electrode CE, respectively, are removed such that the pixel electrode PE and the common electrode CE are electrically floating, the vertical electric field is removed and the BCSN liquid molecules transition from the bend state to a π-twist state which is the other of the bi-stable states. As the BCSN liquid crystal molecules transition to the π-twist state, the BCSN liquid crystal molecules twist by about 180° along a thickness direction of the liquid crystal layer 250 and the directors of the BCSN liquid crystal molecules lie to be parallel to the inner surfaces of the first and second substrates 201 and 261. Accordingly, in the π-twist state, the BCSN liquid crystal molecules have a twist angle of about 180° and a predetermined tilt angle.

Since the π-twist state is one of the bi-stable states, the BCSN liquid crystal molecules do not transition to the splay state as an initial state and keep the π-twist state to be stabilized even when no voltage is applied to the pixel electrode PE and the common electrode CE, i.e., even when the vertical electric field is removed.

For the transition from the splay state to the π-twist state through the bend state, it is required that the difference between the data voltage of the pixel electrode PE and the common voltage Vcom of the common electrode CE is equal to or greater than a first reference voltage, for example, a first threshold voltage. When the difference between the data voltage and the common voltage Vcom is smaller than the threshold voltage, the BCSN liquid crystal molecules do not transition from the bend state to the π-twist state after the data voltage applied to the pixel electrode PE and the common voltage applied to the common electrode CE are removed. Instead, the BCSN liquid crystal molecules transition from the bend state to the splay state again.

Next, when first and second reset voltages Vr1 and Vr2 (of FIG. 1) are applied to the first and second reset electrodes RE1 and RE2, respectively, a horizontal electric field is generated between the first and second reset electrodes RE1 and RE2 due to a difference of the first and second reset voltages Vr1 and Vr2. The horizontal electric field is applied to the BCSN liquid crystal molecules so that the BCSN liquid crystal molecules can transition from the π-twist state to the splay state for the initial orientation. Here, the first and second reset voltages Vr1 and Vr2 are different from each other to generate the horizontal electric field. For example, one of the first and second reset voltages Vr1 and Vr2 may be a relatively high level voltage and the other of the first and second reset voltages Vr1 and Vr2 may be a relatively low level voltage. For the transition from the π-twist state to the splay state, it is required that the difference between the first and second reset voltages Vr1 and Vr2 is equal to or greater than a second reference voltage, for example, a second threshold voltage.

Accordingly, the BCSN liquid crystal molecules have a bi-stable property such that the BCSN liquid crystal molecules transition from the splay state to the π-twist state through the bend state due to generation and removal of the vertical electric field and transition from the π-twist state to the splay state due to generation and removal of the horizontal electric field. Since the twist angle of the splay state is different from the twist angle of the π-twist state, transmittances of the liquid crystal layer 250 in the bi-stable states are different from each other and the transmittance difference is used for an image display.

In the BCSN mode LCD device including the BCSN liquid crystal molecules, power consumption is reduced by using the bi-stable property. For example, when "0" and "1" as image information represent the splay state and the π-twist state, respectively, the pixel region P (of FIG. 2) where the data voltage corresponding to "0" is applied and then is removed may have the splay state and the splay state of the pixel region P may be kept till the other voltages are applied. In addition, the pixel region P where the data voltage corresponding to "1" is applied and then is removed may have the π-twist state and the π-twist state of the pixel region may be kept till the other voltages are applied. Since both the splay state and the π-twist state are a stable state, the splay state and the π-twist state of the pixel region P are kept even when the power is removed.

Since the BCSN liquid crystal molecules have a function remembering the applied data voltage as a memory element, the present images of the bi-stable states are kept being displayed till the next images are displayed. Accordingly, the BCSN mode LCD device displays the images for a long time without additional power consumption. For the purpose of displaying the next images, after the alignment state of the BCSN liquid crystal molecules is restored to the splay state as an initial state by generating the horizontal electric field, the data voltages corresponding to the next images may be applied to the pixel electrode PE.

In addition, a ratio d/p of a cell gap d of the liquid crystal layer 250 including the BCSN liquid crystal molecules to a pitch p of the BCSN liquid crystal molecules may be about 0.25. For example, the required ratio d/p of the cell gap d to the pitch p may be obtained by controlling an amount of chiral dopants added to the BCSN liquid crystal molecules of the liquid crystal layer 250 having a predetermined cell gap p.

Referring again to FIG. 1, the timing controlling portion 300 receives a control signal and an image data Da for displaying images from an external system such as television system or a graphic card. The timing controlling portion 300 generates a gate control signal GCS for controlling the gate driving portion 310 and a data control signal DCS for controlling the data driving portion 320 by using the control signal from the external system. In addition, the timing controlling portion 300 generates a power control signal PCS for controlling the power supplying portion 330. The timing controlling portion 300 may be formed of an integrated circuit (IC) and may be disposed on a printed circuit board (PCB).

The gate driving portion 310 generates a gate voltage including a gate high voltage and a gate low voltage by using the gate control signal GCS from the timing controlling portion 300. The gate driving portion 310 sequentially supplies the gate voltage to the plurality of gate lines GL during a single frame. For example, during a scanning period, a turn-on voltage (e.g., the gate high voltage) may be supplied to the corresponding gate line GL and the TFT T (of FIG. 2) is turned on. In addition, during a non-scanning period, a turn-off voltage (e.g., the gate low voltage) may be supplied to the corresponding gate line GL and the TFT T is turned off.

The data driving portion 320 converts the image data Da of a digital type into an image data of an analog type, i.e., a data voltage by using the data control signal DCS from the timing controlling portion 300 and supplies the data voltage to the plurality of data lines DL. Although not shown, the data driving portion 320 receives a plurality of gamma voltages from a gamma voltage generating portion for generating the data voltage. As a result, the data driving portion 320 generates the data voltage corresponding to the image data Da by using the plurality of gamma voltages.

Each of the gate driving portion 310 and the data driving portion 320 may be formed of a plurality of ICs and may be disposed on a flexible board such as a carrier tape package (TCP) film. The TCP film having the gate driving portion 310 may be connected to one side of the liquid crystal panel 200 corresponding to one end of the plurality of gate lines GL. In addition, the TCP film having the data driving portion 320 may be connected the other side of the liquid crystal panel 200 corresponding to one end of the plurality of data lines DL.

The power supplying portion 330 generates various source voltages for driving the LCD device 100. For example, the power supplying portion 330 may generate the common voltage Vcom, the first reset voltage Vr1 and the second reset voltage Vr2 and supply the common voltage Vcom, the first reset voltage Vr1 and the second reset voltage Vr2 to the liquid crystal panel 200. The power supplying portion 330 may be formed of an IC and may be disposed on the PCB having the timing controlling portion 300.

The common voltage Vcom from the power supplying portion 330 is supplied to the common electrode CE of the liquid crystal panel 200. For example, the common voltage Vcom may be transmitted to the liquid crystal panel 200 through the TCP film having the data driving portion 320 and may be supplied to a common supplying line CSL on the first substrate 201. The common supplying line CSL may be connected to the common electrode CE on the second substrate 261, for example, through a silver (Ag) dot AD. Accordingly, the common voltage Vcom from the power supplying portion 330 is transmitted to the common electrode CE on the second substrate 261.

When the common line for the storage capacitor Cst is formed on the first substrate 201, the common line may be connected to the common supplying line CSL. As a result, the common voltage Vcom is transmitted to the other electrode of the storage capacitor Cst.

The common supplying line CSL has various shapes in a non-display area surrounding a display area of the first substrate 210. For example, the common supplying line CSL may be disposed in the non-display area corresponding to an end portion of the gate line GL of the liquid crystal panel 200 and/or in the non-display area corresponding to an end portion of the data line DL of the liquid crystal panel 200.

The first and second reset voltages Vr1 and Vr2 from the power supplying portion 330 are supplied to the first and second reset electrodes RE1 and RE2, respectively, of the liquid crystal panel 200. For example, the first and second reset voltages Vr1 and Vr2 may be transmitted to the liquid crystal panel 200 through the TCP film having the data driving portion 330 and may be supplied to the first and second reset electrodes RE1 and RE2, respectively, of the first substrate 201.

End portions of the plurality of first reset electrodes RE1 are connected to a first reset supplying line RSL1, and end portions of the plurality of second reset electrodes RE2 are connected to a second reset supplying line RSL2. A connecting portion of the first reset electrode RE1 and the first reset supplying line RSL1 and a connecting portion of the second reset electrode RE2 and the second reset supplying line RSL2 may be disposed at both sides, respectively, of the display area. The display area may be defined as an area displaying an image and including the plurality of pixel regions P, and the non-display area may be defined as a periphery of the display area to include the common supplying line CSL, the first reset supplying line RSL1 and the second reset supplying line RSL2. Here, the first and second reset electrodes RE1 and RE2 may extend from the first and second reset supplying line RSL1 and RE2, respectively.

When the first and second reset electrodes RE1 and RE2 are formed on the second substrate 261, the first and second reset supplying lines RSL1 and RSL2 may be formed on the second substrate 261. In addition, similarly to the common voltage Vcom transmitted to the common electrode CE, the first and second reset voltages Vr1 and Vr2 may be transmitted from the first substrate 201 to the second substrate 261 by using an element such as a silver dot AD.

As a result, the first reset voltage Vr1 is applied to the plurality of first reset electrodes RE1 and the second reset voltage Vr2 is applied to the plurality of second reset electrodes RE2. Since all the pixel regions P are reset at the same time, the whole BCSN liquid crystal molecules in the liquid crystal layer 250 of the liquid crystal panel 200 return to the splay state as an initial state simultaneously. In the BCSN mode LCD device 100, the BCSN liquid crystal molecules of the liquid crystal panel 200 are not independently reset by the pixel region P. Instead, the whole BCSN liquid crystal molecules of the liquid crystal panel 200 are reset at the same time. Accordingly, the BCSN liquid crystal molecules are efficiently reset during a relatively short time period.

Figure 4:
FIG. 4 is a view showing a sequence of periods and voltages for driving a bi-stable chiral splay nematic mode liquid crystal display device according to an embodiment of the present invention.
Figure 5:
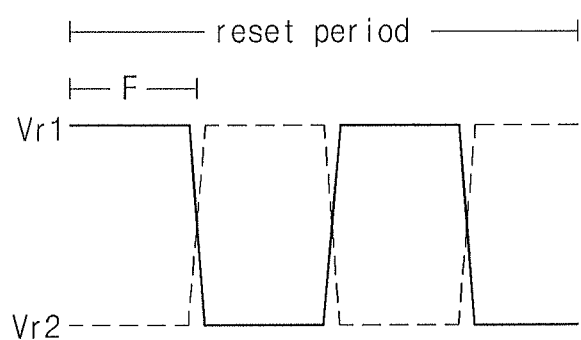
FIG. 5 is a view showing a reset voltage of a reset period for a bi-stable chiral splay nematic mode liquid crystal display device according to an embodiment of the present invention.

A method of driving a BCSN mode LCD device will be illustrated as referring to FIGS. 4 and 5.

FIG. 4 is a view showing a sequence of periods and voltages for driving a bi-stable chiral splay nematic mode liquid crystal display device according to an embodiment of the present invention, and FIG. 5 is a view showing a reset voltage of a reset period for a bi-stable chiral splay nematic mode liquid crystal display device according to an embodiment of the present invention.

In FIG. 4, a bi-stable chiral splay nematic (BCSN) mode liquid crystal display (LCD) device is driven through a reset period, a writing period and a memory period. During the reset period, the pixel electrode PE (of FIG. 3) and the common electrode CE (of FIG. 3) are floating, and the first and second reset voltages Vr1 and Vr2 are applied to the first and second reset electrodes RE1 and RE2 (of FIG. 3), respectively. As a result, the BCSN liquid crystal molecules having one of the bi-stable states for the displayed image, i.e., the pervious image are reset to have the splay state as an initial state. For example, the reset period may correspond to at least one frame and the frame may correspond to a time for writing the image data Da onto all the pixel regions P during the writing period.

In addition, the first and second reset voltages Vr1 and Vr2 may be inverted at least once during the reset period. As shown in FIG. 5, the first and second reset voltages Vr1 and Vr2 may be applied to the first and second reset electrodes RE1 and RE2, respectively, during the reset period corresponding to 4 frames F. A relative polarity of the first reset voltage Vr1 may be inverted by frame F, and a relative polarity of the second reset voltage Vr2 may be inverted by frame F. In addition, the first and second reset voltages Vr1 and Vr2 may have relative polarities opposite to each other at a given juncture. For example, each of the first and second reset voltages Vr1 and Vr2 may alternately have a high level voltage and a low level voltage by frame F. When the first reset voltage Vr1 has the high level voltage, the second reset voltage Vr2 has the low level voltage.

Further, a horizontal electric field is generated due to the difference between the first and second reset voltages Vr1 and Vr2, and the BCSN liquid crystal molecules in the liquid crystal layer 250 transition from the π-twist state to the splay state. Since the polarities of the first and second reset voltages Vr1 and Vr2 are periodically inverted, a direction of the horizontal electric field is periodically changed. As a result, charge accumulation on the first and second reset electrodes RE1 and RE2 is prevented.

In addition, during the reset period, the gate driving portion 310 and the data driving portion 320 may be turned off such that the gate voltage and the data voltage are not supplied. The power supplying portion 330 may be partially turned off such that the common voltage is not supplied. As a result, the TFT T (of FIG. 2) may be turned off and the pixel electrode PE and the common electrode CE may be floating during the reset period.

During the writing period, the gate driving portion 310 and the data driving portion 320 may be turned on such that the gate voltage and the data voltage of the gate voltage are supplied to the gate line GL (of FIG. 2) and the data line DL (of FIG. 2), respectively. As a result, the gate high voltage of the gate voltage is sequentially applied to the plurality of gate lines GL and the TFTs T connected to the plurality of gate lines GL are sequentially turned on. In addition, when the corresponding TFT T is turned on, the data voltage Vd, i.e., the image data of an analog type corresponding to the present image is applied to the data line DL and is transmitted to the pixel electrode PE through the TFT T.

The transition from the splay state to the π-twist state of the BCSN liquid crystal molecules in the liquid crystal layer 250 is determined by the voltage difference between the pixel electrode PE and the common electrode CE in the writing period. For example, when the voltage difference between the pixel electrode PE and the common electrode CE is equal to or greater than the first threshold voltage, the BCSN liquid crystal molecules may transition from the splay state to the π-twist state through the bend state. Further, when the voltage difference between the pixel electrode PE and the common electrode CE is smaller than the first threshold voltage, the BCSN liquid crystal molecules may not transition to the π-twist state and may remain in the splay state.

In addition, during the writing period, the power supplying portion 330 may be partially turned off such that the first and second reset voltages Vr1 and Vr2 are not supplied. As a result, the first and second reset electrodes RE1 and RE2 may be floating and the horizontal electric field is not applied to the BCSN liquid crystal molecules during the writing period.

During the memory period, the gate driving portion 310 and the data driving portion 320 may be turned off such that the gate voltage and the data voltage are not supplied. Further, the power supplying portion 330 may be partially turned off such that the first reset voltage Vr1, the second reset voltage Vr2 and the common voltage Vcom are not supplied. As a result, the pixel electrode PE, the common electrode CE, the first reset electrode RE1 and the second reset electrode RE2 may be floating and no electric field is generated in the liquid crystal layer 250. Accordingly, the BCSN liquid crystal molecules in the liquid crystal layer 250 having the high bend state during the writing period may transition to the π-twist state of the bi-stable states. Moreover, the BCSN liquid crystal molecules having the low bend state during the writing period may transition to the splay state of the bi-stable states.

The memory period is kept till the reset period for displaying the next image. As a result, the BCSN liquid crystal molecules have one of the splay state and the π-twist state during the memory period. Accordingly, the BCSN mode LCD device keeps displaying the present image before the next image is displayed without an additional power consumption so that the power consumption can be reduced as compared with the LCD device of the related art.

The outputs of the power supplying portion 330, the gate driving portion 310 and the data driving portion 320 may be determined by the output timing control of the timing controlling portion 300 during the reset period, the writing period and the memory period. The timing controlling portion 300 may control the output timing of the power supplying portion 330, the gate driving portion 310 and the data driving portion 320 by changing the control signals according to the display period.

Consequently, in the BCSN mode LCD device according to the present invention, since the BCSN liquid crystal molecules having a bi-stable property are used as a memory element for displaying images, power consumption is reduced. In addition, since the BCSN liquid crystal molecules of all the pixel regions are reset at the same time, the BCSN liquid crystal molecules are efficiently reset during a relatively short time period.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of driving a liquid crystal display device including a bi-stable chiral splay nematic liquid crystal layer having bi-stable states of a splay state as an initial state and a π-twist state, comprising:

applying a data voltage and a common voltage to a pixel electrode in each of a plurality of pixel regions and a common electrode facing the pixel electrode, respectively during a writing period;

floating each of the pixel electrode and the common electrode by not supplying each of the data voltage and the common voltage such that the bi-stable chiral splay nematic liquid crystal layer has the bi-stable states corresponding to the data voltage during a memory period; and applying first and second reset voltages to at least one first reset electrode and at least one second reset electrode, respectively, during a reset period, wherein the bi-stable chiral splay nematic liquid crystal layer transitions from the π-twist state to the splay state during the reset period, wherein each of the plurality of pixel regions includes a thin film transistor connected to a corresponding one of a plurality of gate lines and a corresponding one of a plurality of data lines crossing each other on a first substrate, wherein the at least one first reset electrode and the at least one second reset electrode extend along a direction parallel to one of the plurality of gate lines and the plurality of data lines, and pass through the plurality of pixel regions, and wherein each of the first and second reset voltages for transitioning the bi-stable chiral splay nematic liquid crystal layer from the π-twist state to the splay state alternately has a high level voltage and a low level voltage, and the first and second reset voltages have relatively opposite polarities.

2. The method according to claim 1, wherein each of the at least one first reset electrode and the at least one second reset electrode are floating by not supplying each of the first and second reset voltages during the writing period and the memory period.

3. The method according to claim 1, wherein the pixel electrode is formed on the first substrate and is connected to the thin film transistor, wherein the common electrode is formed on a second substrate, wherein the at least one first reset electrode and the at least one second reset electrode are formed on one of the first and second substrates, and wherein the bi-stable chiral splay nematic liquid crystal layer is formed between the first and second substrates.

4. The method according to claim 3, wherein the liquid crystal display device comprises:

a first reset supplying line connected to the at least one first reset electrode;

a second reset supplying line connected to the at least one second reset electrode; and a power supplying portion supplying the first and second reset voltages to the first and second reset supplying lines, respectively, and supplying a common voltage to the common electrode.

5. The method according to claim 4, wherein the at least one first reset electrode, the at least one second reset electrode, the first reset supplying line and the second reset supplying line are formed on the first substrate.

6. The method according to claim 1, wherein a spacing distance between the at least one first reset electrode and the at least one second reset electrode is within a range of about 3 μm to about 100 μm.

* * * * *